(12) United States Patent
Voss

(10) Patent No.: US 8,281,863 B2
(45) Date of Patent: Oct. 9, 2012

(54) DETACHABLE ELECTRICAL ACTUATOR

(75) Inventor: Robert K. Voss, Aberdeen (GB)

(73) Assignee: Vetco Gray Inc., Houston, TX (US)

( * ) Notice: Subject to any disclaimer, the term of this patent is extended or adjusted under 35 U.S.C. 154(b) by 345 days.

(21) Appl. No.: 12/394,504

(22) Filed: Feb. 27, 2009

(65) Prior Publication Data

US 2009/0211762 A1 Aug. 27, 2009

Related U.S. Application Data

(60) Provisional application No. 61/056,725, filed on May 28, 2008.

(51) Int. Cl.
*E21B 7/12* (2006.01)

(52) U.S. Cl. ............ 166/351; 166/332.4; 166/344; 166/383; 166/386; 166/66.6

(58) Field of Classification Search .......... 166/339, 166/344, 368, 373, 374, 381, 383, 386, 66.6, 166/330, 332.1, 332.4
See application file for complete search history.

(56) References Cited

U.S. PATENT DOCUMENTS

| | | | | |
|---|---|---|---|---|
| 2,885,172 A * | 5/1959 | Natho | ............... | 251/14 |
| 3,186,486 A * | 6/1965 | Rhodes et al. | ............... | 166/340 |
| 3,633,667 A * | 1/1972 | Falkner, Jr. | ............... | 166/366 |
| 3,646,962 A * | 3/1972 | Jones | ............... | 137/594 |
| 3,850,237 A * | 11/1974 | Ahlstone et al. | ............... | 166/336 |
| 4,294,284 A * | 10/1981 | Herd | ............... | 137/613 |
| 4,476,935 A * | 10/1984 | Hynes et al. | ............... | 166/373 |
| 4,572,298 A * | 2/1986 | Weston | ............... | 166/379 |
| 4,650,151 A * | 3/1987 | McIntyre | ............... | 251/14 |
| 4,770,389 A * | 9/1988 | Bodine et al. | ............... | 251/129.1 |
| 4,809,733 A * | 3/1989 | Hawkins | ............... | 137/236.1 |
| 4,920,811 A * | 5/1990 | Hopper | ............... | 74/2 |
| 5,195,721 A * | 3/1993 | Akkerman | ............... | 251/129.13 |
| 5,372,199 A * | 12/1994 | Cegielski et al. | ............... | 166/368 |
| 5,526,883 A * | 6/1996 | Breaux | ............... | 166/373 |
| 5,535,826 A * | 7/1996 | Brown et al. | ............... | 166/363 |
| 5,971,077 A * | 10/1999 | Lilley | ............... | 166/368 |
| 6,053,252 A * | 4/2000 | Edwards | ............... | 166/348 |
| 6,076,605 A * | 6/2000 | Lilley et al. | ............... | 166/368 |
| 6,257,549 B1* | 7/2001 | Hopper | ............... | 251/129.11 |
| 6,453,995 B2* | 9/2002 | Gatherar et al. | ............... | 166/75.14 |
| 6,595,487 B2* | 7/2003 | Johansen et al. | ............... | 251/129.04 |
| 6,978,839 B2 | 12/2005 | Fenton et al. | | |
| 6,981,428 B2* | 1/2006 | Donald et al. | ............... | 74/89.26 |
| 7,156,169 B2* | 1/2007 | Bartlett | ............... | 166/66.7 |
| 2008/0083892 A1 | 4/2008 | Fenton | | |
| 2009/0211762 A1* | 8/2009 | Voss | ............... | 166/351 |
| 2009/0212969 A1* | 8/2009 | Voss | ............... | 340/853.1 |

OTHER PUBLICATIONS

FMC Technologies Information Sheet for Long Distance Challenges—Control Systems (25 pages).
StatoilHydro Information Sheet for All electric control system (22pages).

* cited by examiner

*Primary Examiner* — Thomas Beach
*Assistant Examiner* — Aaron Lembo
(74) *Attorney, Agent, or Firm* — Bracewell & Giuliani LLP

(57) ABSTRACT

A removable module for actuating elements, such as valves, within a subsea production tree. The module can include a motor, a drive shaft, and a ball screw. Embodiments exist where only the motor is removable, optionally the motor and drive shaft and/or all module elements are removable. A fail safe system is included that moves the production tree element into a pre-designated fail safe position.

17 Claims, 7 Drawing Sheets

Fig. 2B
Fig. 2C
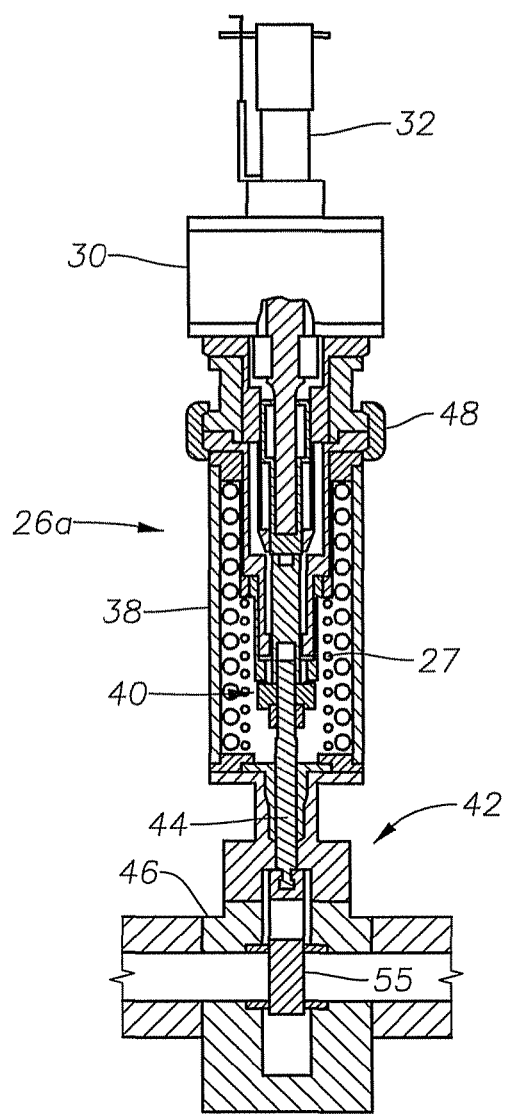
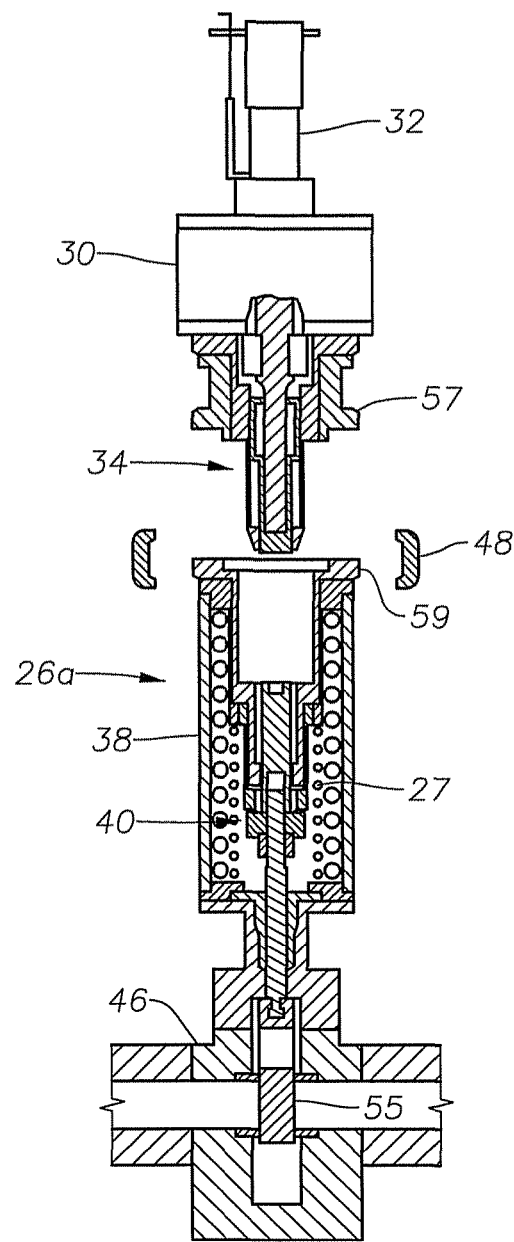

Fig. 4A
Fig. 4B
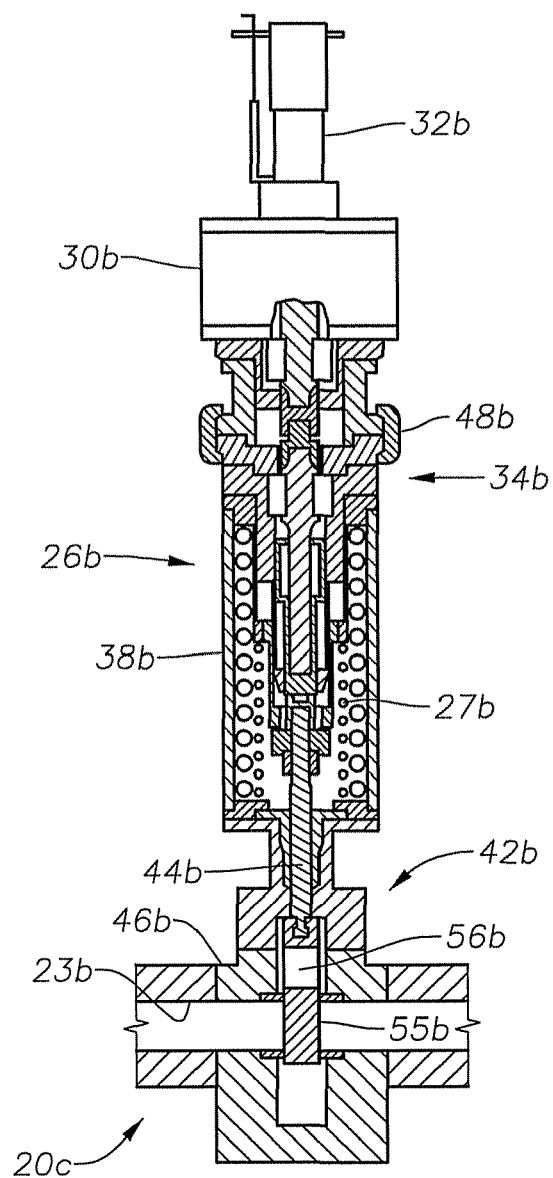
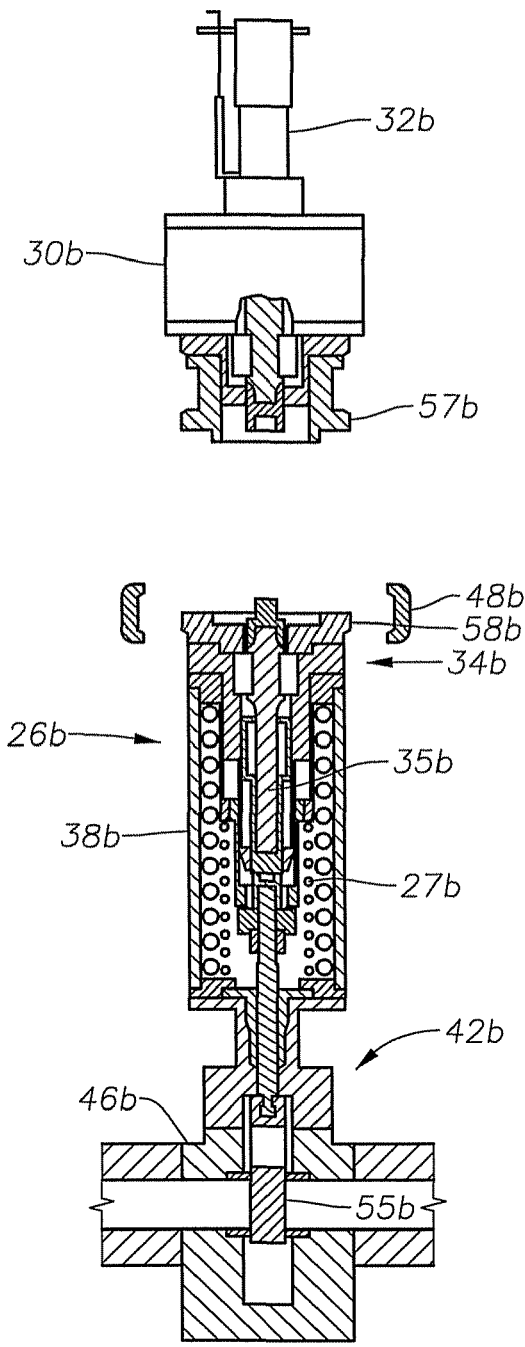

DETACHABLE ELECTRICAL ACTUATOR

CROSS REFERENCE TO RELATED APPLICATIONS

This application claims priority to and the benefit of U.S. Provisional Application Ser. No. 61/031,847 filed Feb. 27, 2008, the full disclosure of which is hereby incorporated by reference herein.

FIELD OF INVENTION

This invention relates in general to production of oil and gas wells, and in particular to a modular electrical actuator for use with a subsea wellhead.

DESCRIPTION OF PRIOR ART

Systems for producing oil and gas from subsea wellbores typically include a subsea wellhead assembly that includes a wellhead housing attached at a wellbore opening, where the wellbore extends through one or more hydrocarbon producing formations. Casing and tubing hangers are landed within the housing for supporting casing and production tubing inserted into the wellbore. The casing lines the wellbore, thereby isolating the wellbore from the surrounding formation. Tubing typically lies concentric within the casing and provides a conduit for producing the hydrocarbons entrained within the formation.

Wellhead assemblies also typically include a production tree connecting to the upper end of the wellhead housing. The production tree controls and distributes the fluids produced from the wellbore. Valves assemblies are typically provided within wellhead production trees for controlling the flow of oil or gas from a wellhead and/or for controlling circulating fluid flow in and out of a wellhead. Gate valves and other sliding stem-type valves have a valve member or disc and operate by selectively moving the stem to insert/remove the valve member into/from the flow of fluid to stop/allow the flow when desired.

SUMMARY OF INVENTION

The present disclosure includes a subsea system for producing hydrocarbons having subsea production tree in fluid communication with a wellbore, an element in the production tree moveable between at least a first position and a second position, a selectively removable actuation module coupled with the production tree having a drive member selectively coupled with the element in the production tree, and a fail safe system in a first configuration coupled to the element in its first position and a second configuration coupled to the element in its second position. The actuation can comprise, a motor, a rotatable drive shaft extending from the motor and a coupling system attached on one end to the drive shaft and on the other end to the member. Energizing the motor can selectively move the element between the first and second position. The fail safe system can include a spring connected to the element that is compressible with element movement into the second position and uncompressible to move the element into a fail safe position. The element can be a valve member, a choke, or a piston. A detent can be included that is in selective anchoring engagement with the drive member. Also optionally included is a fastener on the actuation module selectively attachable and detachable with a fastening element on the production tree. The actuation module can include a motor and a drive shaft selectively coupled with the motor. The system includes a detachable configuration where the motor is detached from the production tree, where the motor and drive shaft are detached from the production tree, and a motion translator coupled with the drive shaft where the motor, drive shaft, and motion translator are detached from the production tree.

Also includes is a method of operating a subsea production tree, where the tree includes a selectively moveable element. In one embodiment a selectively removable actuating device is provided in mechanical cooperation with the moveable element; the actuating device is removed, and the moveable element moved into a fail safe position.

BRIEF DESCRIPTION OF THE DRAWINGS

FIGS. 2a-2c illustrate in side cross sectional view modular attachment and detachment of an embodiment of an electrically driven actuator.

FIGS. 4a and 4b illustrate in side view cross sectional modular attachment and detachment of another embodiment of an electrically driven actuator.

DETAILED DESCRIPTION OF THE INVENTION

Figure 1:
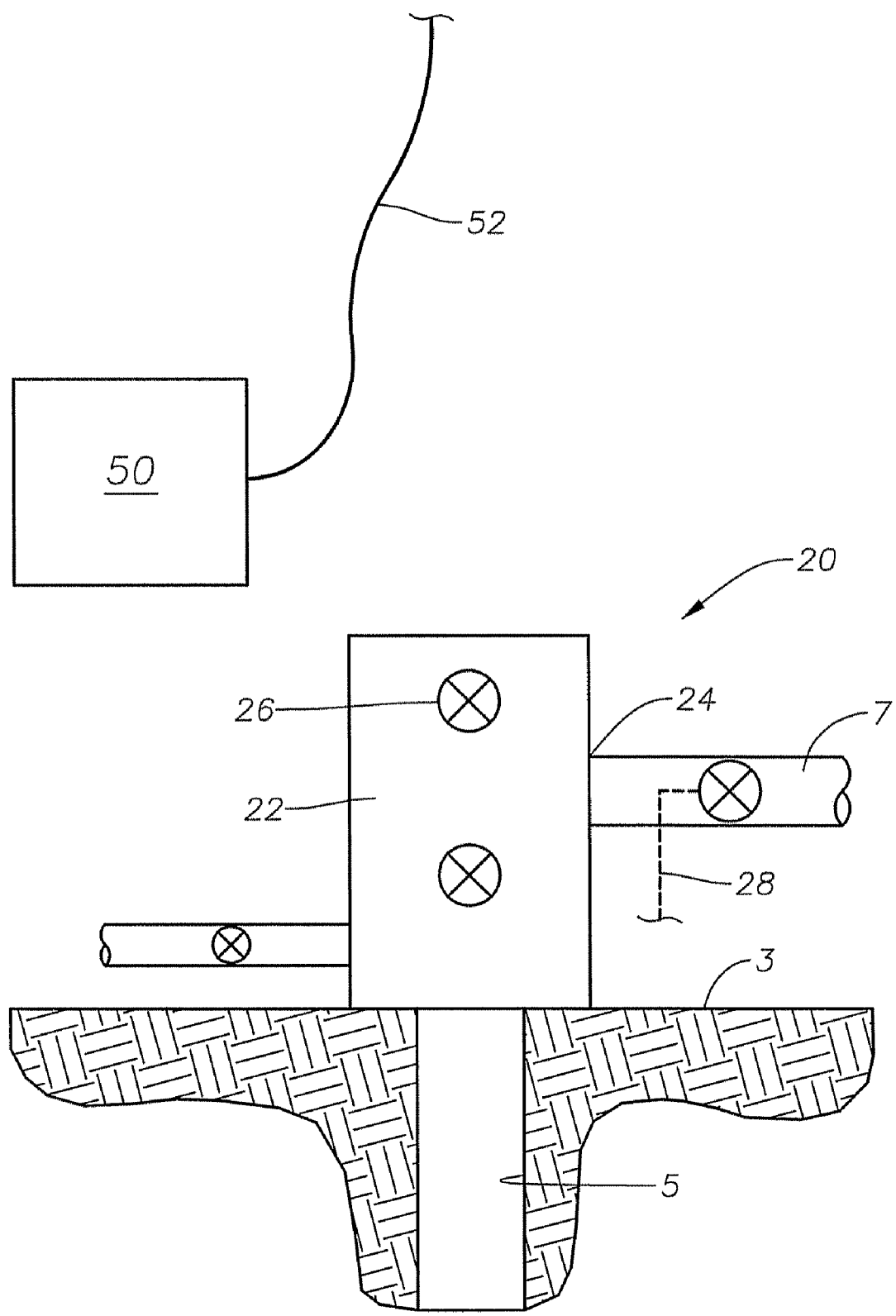
FIG. 1 is a side view of a subsea production tree having modular actuators.

The present invention will now be described more fully hereinafter with reference to the accompanying drawings in which embodiments of the invention are shown. This invention may, however, be embodied in many different forms and should not be construed as limited to the illustrated embodiments set forth herein; rather, these embodiments are provided so that this disclosure will be thorough and complete, and will fully convey the scope of the invention to those skilled in the art. Like numbers refer to like elements throughout. For the convenience in referring to the accompanying figures, directional terms are used for reference and illustration only. For example, the directional terms such as "upper", "lower", "above", "below", and the like are being used to illustrate a relational location.

It is to be understood that the invention is not limited to the exact details of construction, operation, exact materials, or embodiments shown and described, as modifications and equivalents will be apparent to one skilled in the art. In the drawings and specification, there have been disclosed illustrative embodiments of the invention and, although specific terms are employed, they are used in a generic and descriptive sense only and not for the purpose of limitation. Accordingly, the invention is therefore to be limited only by the scope of the appended claims.

With reference now to FIG. 1, a subsea production tree 20 is schematically illustrated in a side view. The tree 20 is secured to the sea floor 3 over a hydrocarbon producing wellbore 5. Hydrocarbons produced from the wellbore 5 are directed through the tree 20 to a delivery flowline 7 shown extending from the subsea production tree 20 housing 22. As shown, the housing 22 includes a series of laterally disposed manifold ports 24. Valves are disposed within the manifold ports 24, as well as the main vertical production bore. The production tree 20 is shown further including actuator modules 26 coupled with each of the manifold ports 24 for driving the valves therein. Lines 28 connect to the actuator modules 26 configured for providing power and/or control to the actuator modules 26. Connections for the lines 28 may include an integral electrical supply cable pigtail. Embodiments of the actuator modules 26 include a power source, such as an electrical motor, and a transmission system for transmitting force from the motor output to valves requiring actuation. The actuator modules 26 are replaceable within the production tree 20, for example by a remotely operated vehicle (ROV) 50. An umbilical 52 is shown attached to the ROV 50 for providing power and control signals to the ROV 50. The ROV 50 can also manipulate the tree 20 using a hydraulic over-ride tool.

Figure 2A:
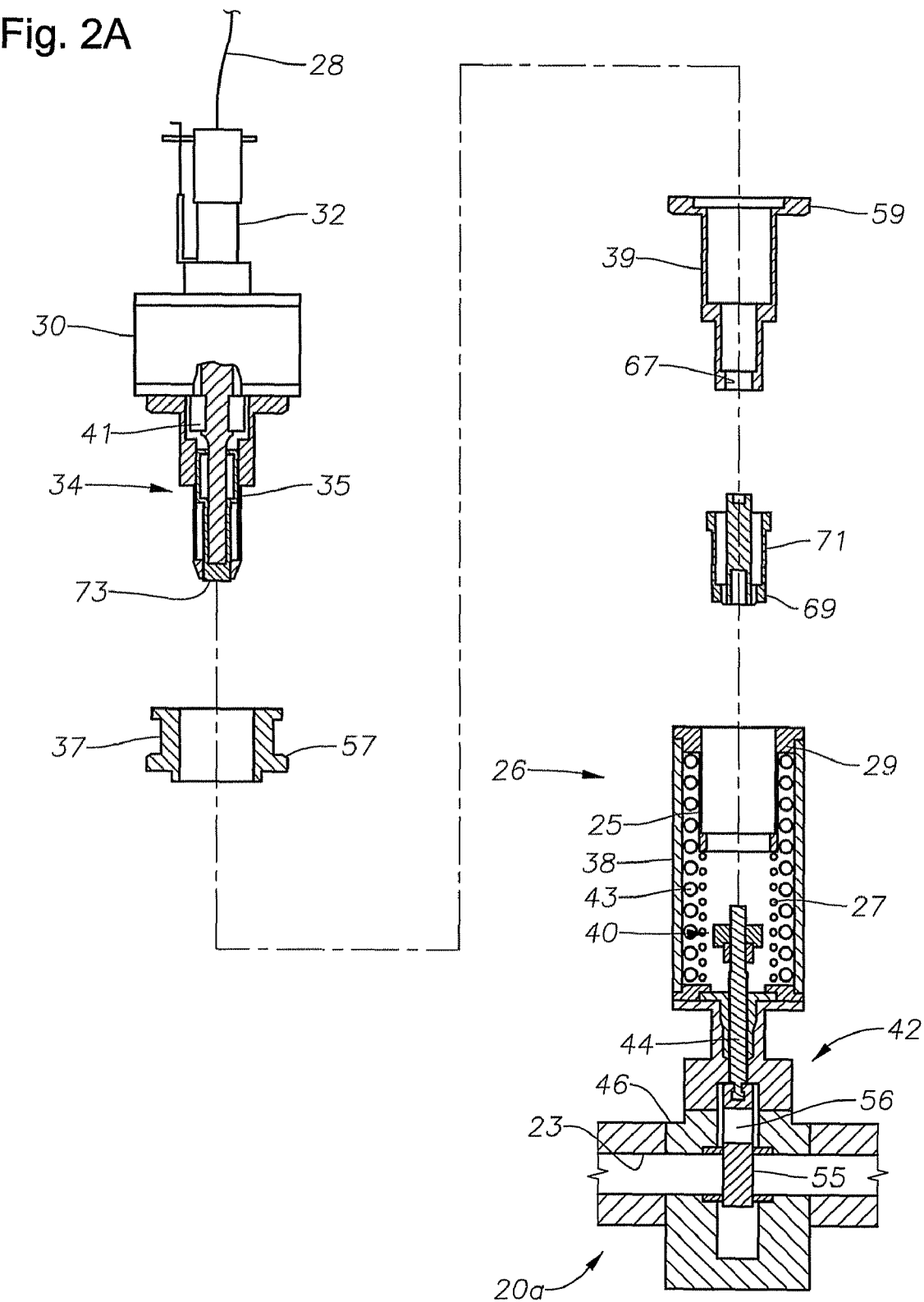

FIG. 2a shows an exploded view of an actuator module 26 embodiment combined with a subsea production tree 20a. The tree 20a shown includes a valve having a body 46 with a through bore 23; that can be closed off by gate 55 moving between open and closed positions to align aperture 56 with the bore 23. The gate 55 may be moved linearly by an attached stem 44 shown guided by a bonnet 42. The opposite end of the stem 44 extends into a housing 38 shown attached on the bonnet 42 upper end. A down stop collar 40 is shown affixed on the stem 44 upper end, the collar 40 limits downward stem 44 travel and can provide an attachment point on its upper end. A collar 25 in the housing 38 includes an outwardly extending ridge on its upper end and an inwardly reaching bead on its lower end. An outer spring 29 is coaxially disposed in the housing 38 spanning from the annular space between the collar 25 and the housing 38 to the housing 38 bottom. The spring 29 upper end contacts the collar 25 ridge. An inner spring 27 is shown seated in the housing 38 circumscribed by the outer spring 29 with its upper end bounded by the collar 25 bead.

A motor 30 with attached shaft 35 and motion translator 34 is included in the actuator module of FIG. 2a. Energizing the motor 30 rotates the shaft 35 within the motion translator 34; the motion translator 34, which is schematically illustrated, converts the shaft's 35 rotational motion into linear motion. A ball screw is an example of a motion translator 34 suitable for use in the device described herein. A detent 41 is schematically depicted with the motor 30 and the shaft 35. As described in greater detail below, the detent 41 selectively holds the shaft 35 stationary in the power off condition. On receipt (or absence depending on control system configuration) of a suitable signal, the detent 41 may be configured to release, allowing the motor 30 to backdrive. An annular adapter 37 is provided having an upper end adapted to be mounted on the motor 35 housing circumscribing the drive shaft 35 base. The adapter 37 lower end includes a clamp profile 57 extending radially outward and along the adapter 37 periphery.

With reference now to FIGS. 2A-2C, an assembled embodiment of the actuator module 26 is shown in a side sectional view illustrating a thrust coupling 69 mechanically connected to the stem 44 via the down stop collar 40. The thrust coupling 69 includes upwardly extending legs 71 with enlarged tips shown coaxially within the collar 25. In this configuration the thrust coupling 69 is secured with the collar 25. A sleeve 39 has an upper portion 59 contoured to fit within collar 25, and a lower smaller diameter portion that extends downward to the down stop collar 40. The sleeve 39 includes dogs 67 on its lower end spanning radially inward towards the thrust coupling 69. An open region between the motion translator 34 and the sleeve 39 is flushable after mating to replace potentially harmful seawater with a benign fluid. The open region may also be connected to an actuator volume and hyperbaric pressure compensation system.

The motor 30 assembly can be coupled to the valve assembly 42 by mating the sleeve 39 and adapter 37 together by adding clamps 48 to their respective clamp profiles 57, 59. The clamp 48 can fit over and couple the profiles 57, 59 thereby affixing the sleeve 39 and adapter 37 which in turn mechanically couples the motion translator 34 and the valve assembly 42. Energizing the motor assembly 30 configuration of FIG. 2b actuates the motion translator 34 for opening or closing the gate valve 55 within the valve body 46. The actuator assembly is not limited to operating valves but can power any type of hardware now or later used within a subsea production tree assembly. Also as previously noted, power and/or control for operating or energizing the motor 30 can be provided via the line 28 shown attached to the connector 32.

Coupling the springs 27, 29 with the valve stem 44 and selectively allowing the motor 30 to backdrive provides a fail safe position for the valve. For example, in the embodiment of FIGS. 2a-2c, the valve is illustrated in a closed position with its aperture 56 unregistered with the valve bore 23. Energizing the motor 30 rotates the shaft 35 within the ball screw to push the valve stem 44 and gate 55 so the aperture 56 aligns with the bore 23. This motion also downwardly pushes the collar 25 to compress the springs 27, 29. The motor 30 deactivates when the valve is opened and the detent 41 anchors the shaft 35 and the motion translator 34. Although the compressed springs 27, 29 apply an upward force against the valve stem 44, the stem 44 is prevented from moving upward as long as the motion translator 34 is also locked by the detent 41. However, releasing the detent 41 while the motor 30 is deactivated removes the restrictive force on the springs 27, 29 allowing them to decompress. This pulls the valve stem 44 and gate 55 upward to close the valve. In this scenario the system provides a fail safe failed closed option. An advantage of a fail safe system employing springs 27, 29 rather than batteries or an alternate power supply is their passive nature requires significantly less maintenance and/or monitoring thus enhancing reliability.

FIG. 2c illustrates an example of decoupling the motor 30 and motion translator 34. Decoupling as depicted in FIG. 2c may be accomplished by an ROV 50 that removes the clamps 48 from the profiles 57, 59. Absent the clamps 48, the motion translator 34 can be pulled away from the housing 38, also by an ROV 50. Removing the motor 30 and motion translator 34, as shown, removes added actuation forces moving the valve assembly 42 to a fail safe position as described above. The housing 38 remains attached to the tree 22 during and after the extraction process maintaining its pressure seal around the valve assembly 42.

Figure 3A:
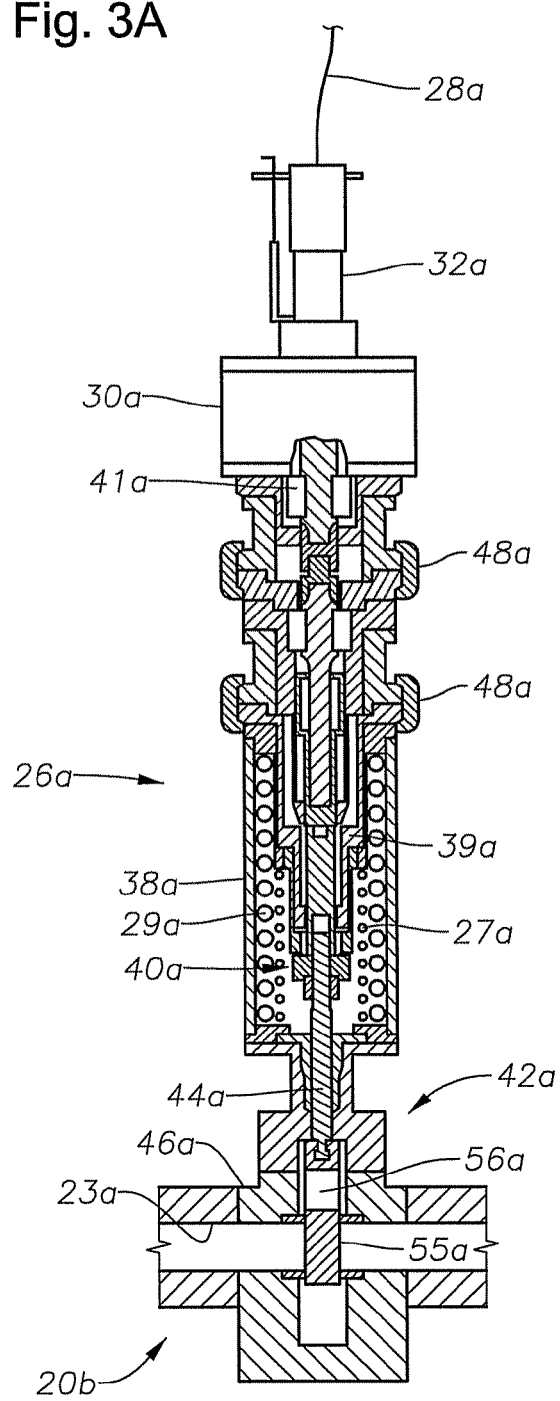
FIGS. 3a and 3b illustrate in side cross sectional view modular attachment and detachment of an alternative embodiment of an electrically driven actuator.
Figure 3B:
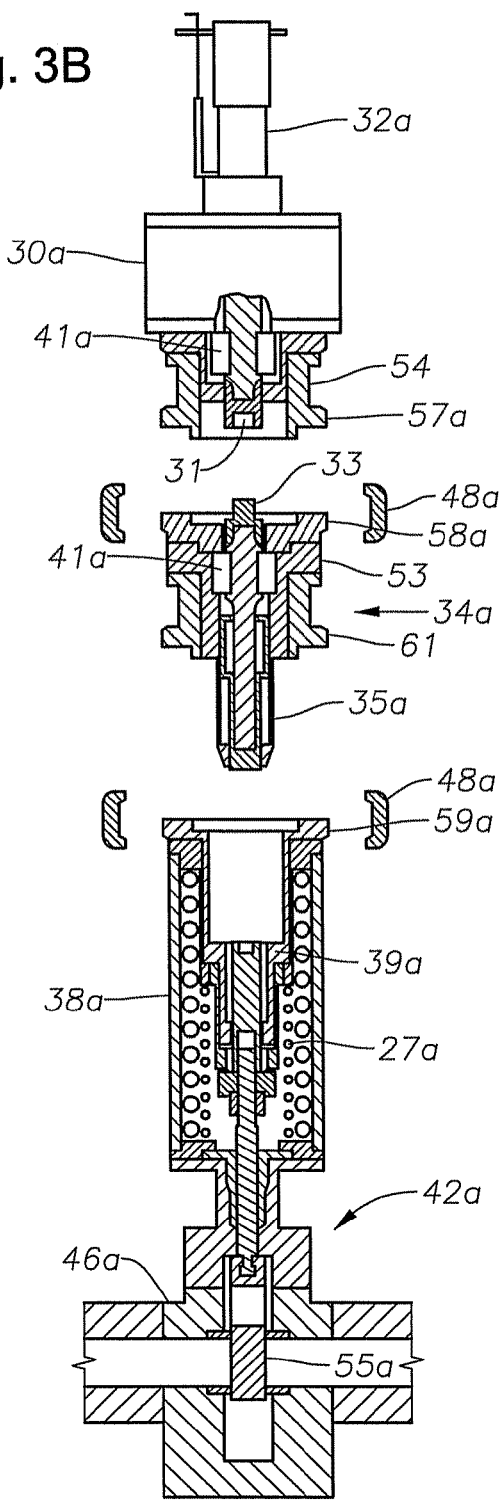

FIGS. 3a and 3b illustrate in side cross sectional view an alternative embodiment of an actuator module 26a. As shown, the actuator module 26a includes a motor assembly 30a, a motion translator 34a, a housing 38a, and a valve assembly; all shown coupled together. Here a motor assembly 30a is shown having an associated connector 32a for connecting the motor assembly 30a with a power/control line 28a. FIG. 3a illustrates an assembled embodiment of the actuator module 26a affixed to a subsea production tree 20a. The actuator module 26a is adaptable for actuating components within the tree 20a, such as a valve or a choke assembly. In this embodiment detents 41a are shown on the motor assembly 30a and the motion translator 34a. The motor assembly 30a shown includes an output coupling 31 rotatable with motor operation. The motion translator 34a depicted connects to a drive shaft 35a rotatable within a housing 53 having a shaft coupling 33 configured to engage the output coupling 31 so that rotating the output coupling 31 rotates the shaft coupling 33 and drive shaft 35a. The motor assembly 30a includes a clamp profile 57a radially extending outward from the lower end of an annular sleeve 54. The sleeve 54 is shown affixed to the motor assembly 30a lower surface circumscribing the output coupling 31. Radially extending outward from the housing 53 upper end is a clamp profile 58a. Engaging the output coupling 31 and shaft coupling 33 adjacently aligns the clamp profiles 57a, 58a where they are shown held together with a clamp 48a. A sleeve 39a attached within a spring housing 38a includes a clamp profile 59a on its upper end shown clamped to a profile 61 provided on the drive housing 53 lower end.

A valve assembly 42a is shown in FIGS. 3a and 3b, the valve assembly 42a includes a body 46a with a through bore 23a. Moving a gate 55a having an aperture 56a between open and closed positions can align aperture 56a with the bore 23a. The gate 55a may be moved linearly by an attached stem 44a shown guided by a bonnet 42a. A thrust coupling 69 shown affixes to the stem 44a via a down stop collar 40a disposed within the housing 38a. Thus similar to the actuator module 26 embodiment in FIGS. 2a-2c, energizing the motor assembly 30a actuates the valve assembly 42a to selectively move the gate 55a in and/or out of the flow bore 23a.

FIG. 3b illustrates a disassembled view of the module 26a depicting the motor assembly 30a separated from its corresponding motion translator 34a. Clamps 48a are shown removed from profiles 57a, 58a and 61, 59a, thereby allowing motion translator 34a detachment from the motor assembly 30a and from the housing 38a. This embodiment of the module 26a provides for selective removal and/or motor assembly 30a replacement with or without removing the motion translator 34a. Optionally both may be removed and replaced as well. The coupling and decoupling actions of the module 26a may be performed by an ROV as discussed previously.

FIGS. 4a and 4b illustrate another alternative embodiment of an actuator module 26b shown in side sectional view. In this embodiment, the actuator module 26b includes a motor assembly 30b, a motion translator 34b, and a spring housing 38b. Profiles 57b and 58b, similar to profiles 57a and 57b in FIG. 3b, are respectively provided on the motor assembly 30b and the motion translator 34b. A clamp 48b can be used to selectively couple the profiles 57b and 58b. In this embodiment however the motion translator 34b is not secured to the housing 38b using externally accessible clamps. Accordingly, only the motor assembly 30b is selectively removable in this embodiment. As shown in FIG. 4b, the drive shaft assembly 35b remains in the housing 38b when the motor 30b is detached.

A valve assembly 42b is shown in FIGS. 4a and 4b, the valve assembly 42b includes a body 46b with a through bore 23b. Moving a gate 55b having an aperture 56b between open and closed positions can align aperture 56b with the bore 23b. The gate 55b may be moved linearly by an attached stem 44b shown guided by a bonnet 42b. A thrust coupling 69 shown affixes to the stem 44b via an interface 40b disposed within the spring housing 38b. Thus similar to the actuator module 26 embodiment in FIGS. 2a-2c, energizing the motor assembly 30b actuates the valve assembly 42b to selectively move the gate 55b in or out of the flow bore 23b.

Figure 5:
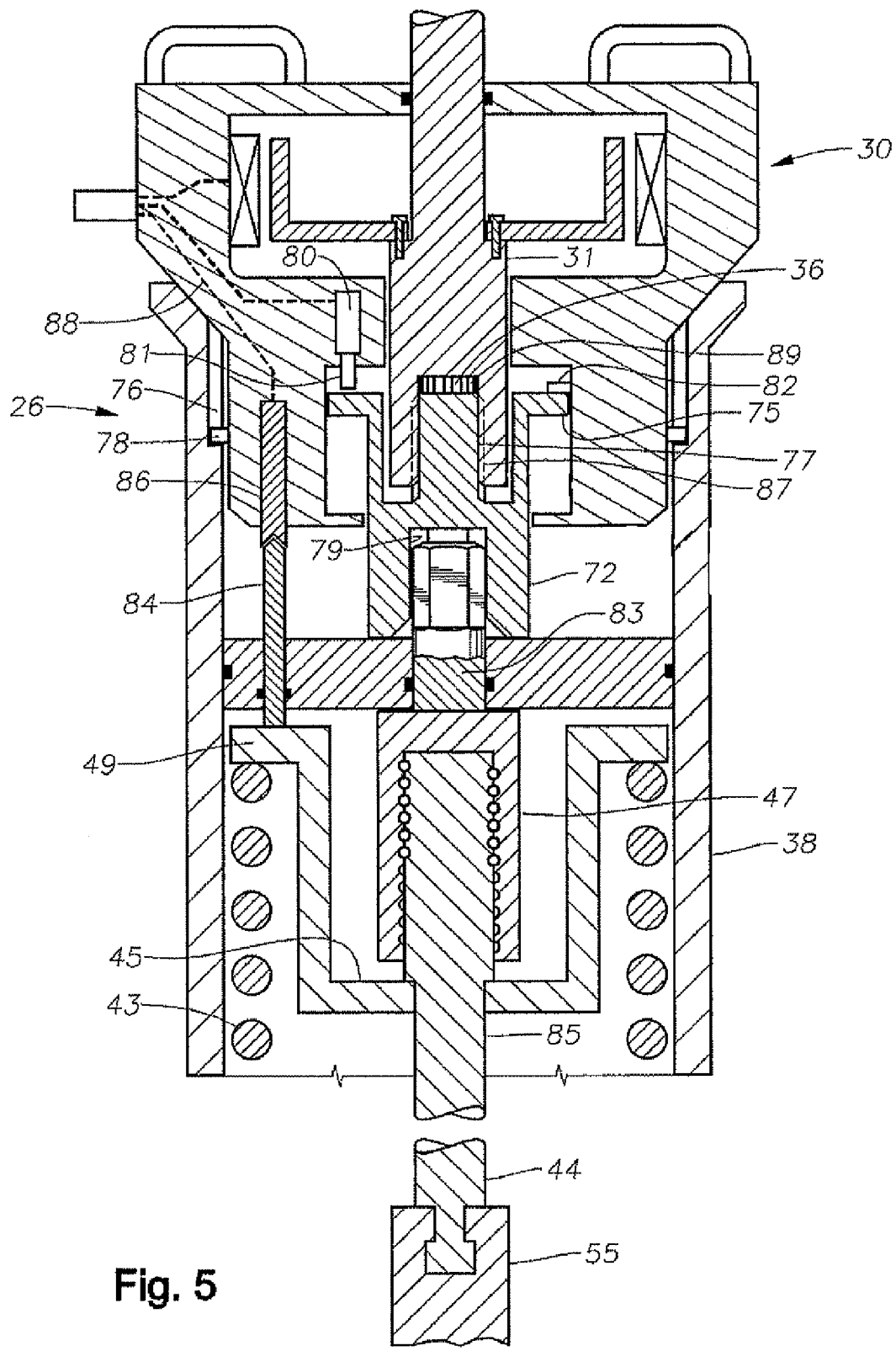
FIG. 5 is a side partial sectional view of an embodiment of a modular actuator.

FIG. 5 illustrates a partial sectional view of an embodiment of an actuator module 26. As shown, J-slots 76 are provided in the housing inner surface; dogs 78 engage the J-slots 76 for mounting the motor 30 to the housing 38. The J-slots 76 are grooves that run longitudinally from the housing 38 opening for a length then travel transverse along the housing 38 inner circumference. Thus mounting the motor 30 to the housing 38 can involve aligning the dogs 78 with the J-slot 76 openings, inwardly urging the motor 30 until the dogs 78 reach the transverse portion, and rotating the motor 30 thereby pushing the dogs 78 into the slot 76 ends.

Figure 6:
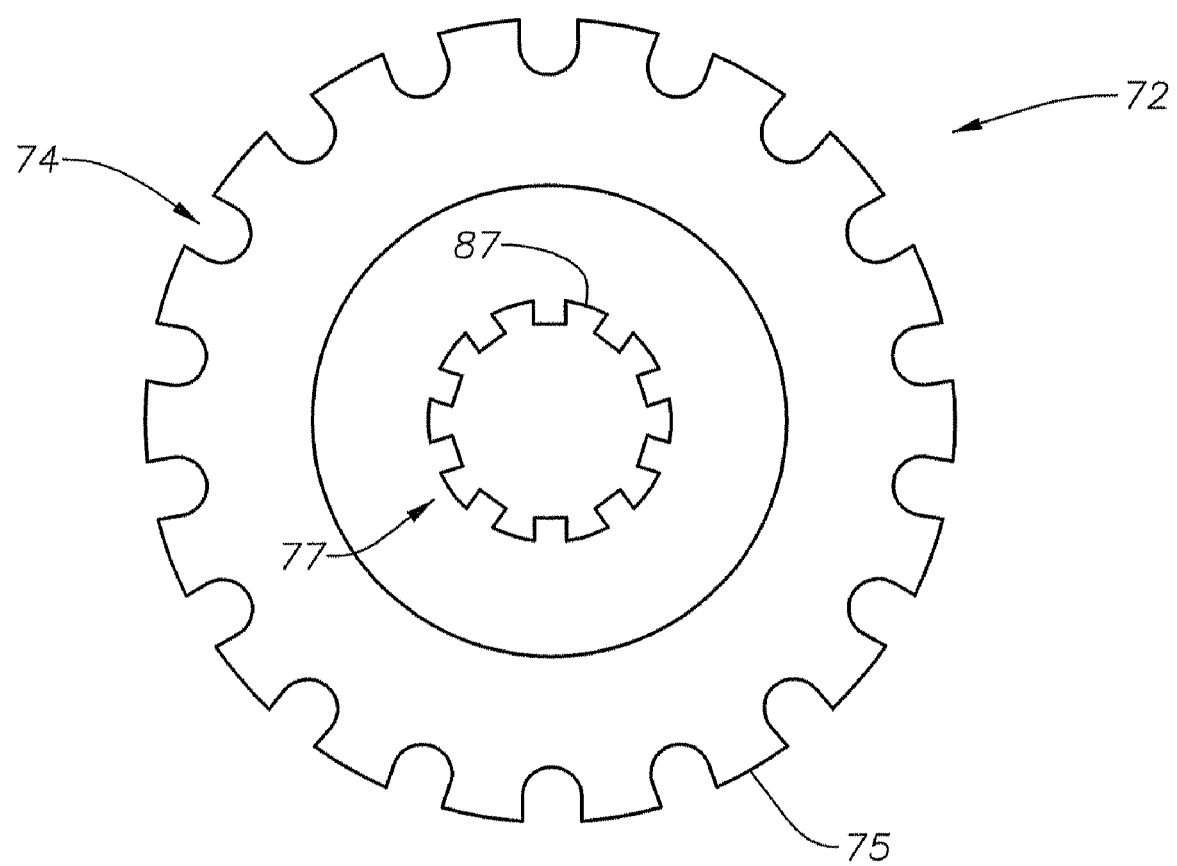
FIG. 6 is an overhead view of a drive nut of FIG. 5.

The motor 30 includes an output coupling 31 that extends from the motor 30 having a receptacle 36 provided on its end opposite the motor 30. A shaft 77, having axial splines 87 on its outer surface, is shown inserted into the receptacle 36. Corresponding splines 89 in the receptacle 36 engage the shaft 77 splines 87 for rotationally coupling the shaft 77 and output coupling 31. As shown, both sets of splines 87, 89 are oriented axial to the shaft 77 and coupling 31, thus the shaft 77 is slideable within the receptacle 36. The shaft 77 includes a portion of a drive nut 72, and is shown extending from the mid-section of the drive nut 72. The drive nut 72 is a generally annular member with a disk like base in the nut 72 midsection oriented perpendicular to the shaft. The nut 72 upper end includes an annular wall shown circumscribing the shaft 77 and a rim 75 that extends radially outward from the upper end away from the shaft 77. Notches 74 (FIG. 6) are formed along the rim 75 outer periphery. A solenoid 80 is shown anchored in the housing 38 having a selectively extendable plunger 81 that can engage a notch 74.

The drive nut 72 lower end includes a socket 79 shown having an end of a drive shaft 83 inserted therein. Similar to the splined coupled between the shaft 77 and the receptacle 36, the drive shaft 83 and socket 79 are rotatingly coupled, but can move axially with respect to each other. In one embodiment, the shaft 83 and socket 79 have flat profiled sides. A spring (not shown) may be included to prevent inadvertently rounding the shaft 83 profile due to initial mating misalignment between the nut 72 and drive shaft 83. The drive shaft 83 lower end affixes to a ball screw assembly 47 for translating rotational motion to linear. A threaded bar 85 extends from the ball screw assembly 47 lower end and attaches to a valve stem 44. The valve stem 44 connects to a gate 55 on its end opposite the threaded bar 85.

As shown, the threaded bar 85 passes through and connects with a reaction plate 45 beneath the ball screw assembly 47. Shown in a sectional view, the reaction plate 45 is generally transverse to the housing 38 proximate to its intersection with the bar 85. Away from the bar 85, the plate 45 includes an annular section whose cross section is oriented parallel with the housing 38 wall for a distance, then projects radially outward towards the housing 38 wall to form a lip 49. A spring 43 is coaxially disposed within the housing 38 with its upper end in engagement with the lip 49 lower surface. Thus when the spring 43 is compressed, it will apply a force against the plate 45 urging it away from the gate 55.

The spring 43 and reaction plate 45 can provide a fail safe position for the valve. This could be required when a loss of power occurs. In the example of FIG. 5, the force applied to the threaded rod 85 from the spring 43 and plate 45 combination exerts a rotational force onto the ball screw assembly 47. With sufficient force from the spring 43, the rotational force can backdrive the motor 30 thereby allowing valve stem 44 translational movement to pull the gate 55 into a fail position. The fail position can be either fail open or fail closed. When electrical power is available to the subsea production system, the solenoid 80 can be energized to urge the plunger 81 into one of the notches 74 thereby locking the drive nut 72 against rotation and maintaining the gate 55 in its current position. However the solenoid 80 would not be energized during a power loss and the plunger 81 would disengage from the drive nut 72 thereby removing obstacles that prevent the spring 43 and plate 45 from pushing the stem 44 and gate 55 into a fail safe position. Optionally, a shaped memory alloy (SMA) 82 could be employed with or in lieu of the solenoid 80 for braking the drive nut 72. In an embodiment, a trigger activated by a change in electrical power or temperature is employed to activate or deactivate the SMA 82 and selectively engage or disengage the SMA 82 with/from the drive nut 72. An optional pin 84 is provided on the reaction plate 45 shown engageable with a receptacle 86. Indication of the pin 84 and receptacle 86 engaging or disengaging can be transmitted via a wire 88 shown connected to the receptacle 86.

The present invention described herein, therefore, is well adapted to carry out the objects and attain the ends and advantages mentioned, as well as others inherent therein. While a presently preferred embodiment of the invention has been given for purposes of disclosure, numerous changes exist in the details of procedures for accomplishing the desired results. These and other similar modifications will readily suggest themselves to those skilled in the art, and are intended to be encompassed within the spirit of the present invention disclosed herein and the scope of the appended claims.

What is claimed is:

1. A subsea system for producing hydrocarbons comprising:
    a subsea production member in fluid communication with a wellbore;
    an element in the production member linearly moveable between at least a first position and a second position;
    a cylindrical actuation housing having an inner end mounted to and extending from the production member and an open outer end:
    a stem coupled to the element for linear movement therewith and protruding concentrically into the actuation housing;
        an electrically powered motor having a motor housing assembly and a rotatable drive member extending therefrom;
        a motion translator located within the actuation housing, having a rotatable end linked with the rotatable drive member and a linearly moveable opposite end connected with the stem;
    a fastening assembly connected between the motor housing assembly and the actuation housing to secure the motor housing assembly to the actuation housing with the rotary drive member inserted into the actuation housing, the fastening assembly having cooperative elements on the motor housing and on the actuation housing adjacent the open end of the actuation housing; and
    wherein releasing the fastener assembly enables the motor housing assembly to be retrieved while the actuation housing remains subsea.

2. The system of claim 1, wherein the fastener assembly comprises an external flange on an end of the motor housing assembly, an external flange on the outer end of the actuation housing, and a clamp that engages the external flanges.

3. The system of claim 1, wherein the fastener assembly comprises a plurality of J-slots formed in the actuation housing and a plurality of mating pins on the motor housing assembly.

4. The system of claim 1, wherein the element is selected from the list consisting of a valve member, a choke, and a piston.

5. The system of claim 1, further comprising a fail safe system comprising:
    a coil spring mounted within the actuation housing and coupled to the stem to urge the element from the first position toward the second position, wherein the movement toward the second position causes back spinning of the drive member; and
    a detent in selective anchoring engagement with the drive member to prevent the drive member from back spinning unless electrical power to the motor has ceased.

6. The system of claim 1, wherein the motor housing assembly comprises:
    a motor housing:
    a tubular adapter secured to and protruding from the motor housing, wherein the fastener assembly comprises:
    abutting external flanges located on the tubular adapter and on the actuation housing assembly:
    a clamp selectively engaging the external flanges; and wherein
    the motion translator stabs into engagement with the stem such that releasing the clamp causes the motion translator to be retrieved along with the motor.

7. The system of claim 1, wherein the motor housing assembly comprises:
    a motor housing:
    a first tubular adapter secured to and protruding from the motor housing:
    a second tubular adapter in selective abutment with a forward end of the first tubular adapter:
    a first clamp securing the first tubular adapter to the motor housing:
    a second clamp securing the second tubular adapter to the first tubular adapter; wherein
    the motion translator stabs into engagement with the drive member and the stem such that releasing the second clamp and maintaining the first clamp closed causes the motion translator to be retrieved along with the motor; and
    releasing the first clamp while maintaining the second clamp closed causes the motion translator to remain in the actuation housing while the motor is retrieved.

8. The system of claim 1, wherein the fastener assembly comprises:
    a plurality of J-slots formed in an interior of the actuation housing adjacent the open end;
    a plurality of pins on an exterior portion of the motor housing assembly; and wherein
    the exterior portion of the motor housing assembly stabs into the interior of the actuation housing.

9. The system of claim 1, wherein the production member is selected from the list consisting of a production tree and a manifold.

10. A subsea wellhead assembly for producing hydrocarbons from a subsea wellbore comprising:
    a subsea valve having a valve element linearly moveable between first and second positions, and a valve stem extending therefrom;
        a cylindrical actuation housing mounted to the valve and having an open end opposite the valve, the stem extending concentrically within the actuation housing;
        an electric motor having a rotatable shaft and a motor housing having a portion that inserts into the open end of the actuation housing;
    a pin and slot arrangement on an exterior portion of the motor housing and an interior portion of the actuation housing for releasably latching the motor housing to the actuation housing, enabling the motor to be retrieved while the actuation housing remains subsea;
    a motion translator linkage with a rotatable end selectively coupled with the rotatable shaft from the electric motor and a linearly moveable end connected to the valve stem;

a reaction plate connected to the linearly moveable end of the linkage and movable in unison therewith: and a coil spring coaxially disposed in the actuation housing and having an outer end in contact with the reaction plate for urging the reaction plate and the valve stern toward the open end of the actuation housing.

11. A method of operating a subsea production member having a linearly moveable element therein and a stem extending from the moveable element, the method comprising:

mounting a cylindrical actuation housing to the production member with the stem extending concentrically inside the actuation housing;

connecting a linear movably end of a motion transfer linkage to the stem such that the linkage is enclosed by the actuation housing;

providing an electrical motor with a motor housing assembly, lowering the motor subsea, inserting a rotary drive member of the motor into engagement with a rotatable end of the linkage;

releasably securing the motor housing assembly to the actuation housing;

energizing the motor to drive the linkage;

linearly moving the moveable element with the linkage; and releasing the motor housing assembly from the actuation housing, and retrieving the motor housing assembly.

12. The method of claim 11, wherein releasably securing the motor housing assembly to the actuation housing comprises latching the motor housing assembly to the actuation housing employing a pin and slot arrangement.

13. The method of claim, 11 wherein releasably securing the motor housing assembly to the actuation housing comprises clamping the motor housing assembly to the actuation housing.

14. The method of claim 11, wherein the moveable element is selected from the list consisting of a valve, a choke, and a piston.

15. The method of claim 11, wherein the linear movably end of the linkage remains connected to the stem after the motor is retrieved.

16. The method of claim 11, wherein releasably securing the motor housing assembly to the actuation housing comprises engaging pins on the motor housing assembly with J-slots provided in the actuation housing, and rotating the motor housing assembly relative to the actuation housing an increment.

17. The method of claim 11, wherein retrieving the motor housing assembly further comprises releasing the linkage from engagement with the stem and retrieving the linkage along with the motor housing assembly.

* * * * *